No. 621,584. Patented Mar. 21, 1899.
L. B. REEDS.
COMBINED DRAG AND LAND LEVELER.
(Application filed Dec. 20, 1898.)
(No Model.)
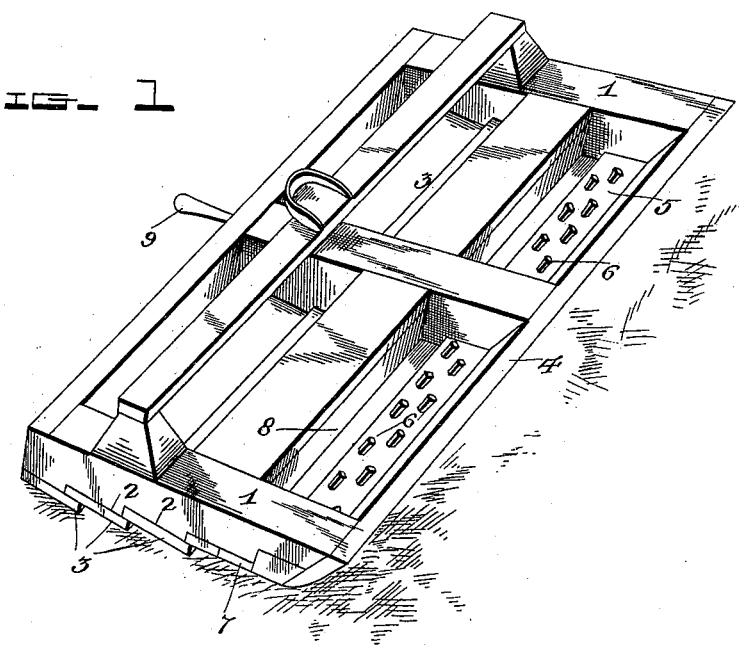
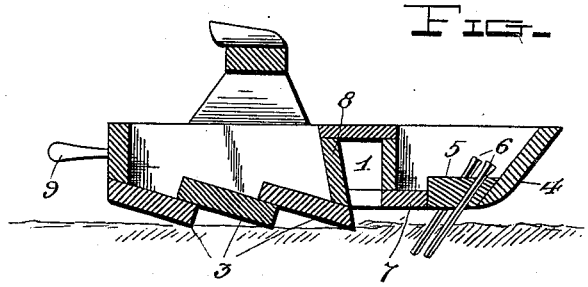

UNITED STATES PATENT OFFICE.

LUCIAN B. REEDS, OF CRUTCHFIELD, KENTUCKY.

COMBINED DRAG AND LAND-LEVELER.

SPECIFICATION forming part of Letters Patent No. 621,584, dated March 21, 1899.

Application filed December 20, 1898. Serial No. 699,795. (No model.)

*To all whom it may concern:*

Be it known that I, LUCIAN B. REEDS, a citizen of the United States, residing at Crutchfield, in the county of Fulton and State of Kentucky, have invented certain new and useful Improvements in a Combined Drag and Land-Leveler; and I do declare the following to be a full, clear, and exact description of the invention, such as will enable others skilled in the art to which it appertains to make and use the same.

The invention has relation to a combined drag and land-leveler; and the object is to provide a device of this character which shall be simple of construction, durable in use, and by means of which the ground will be thoroughly harrowed and holes and ruts covered over and the land generally smoothed or leveled.
With this object in view the invention consists in certain features of construction and combination of parts, which will be hereinafter fully described, and particularly pointed out in the appended claim.
In the accompanying drawings, Figure 1 is a perspective view of my combined harrow and land-leveler. Fig. 2 is a longitudinal sectional view.

In the drawings, 1 denotes the side pieces of the machine, the under edges of which are provided with stepped recesses 2, in which are secured the ends of the drag-bars 3. The forward ends of the side pieces are beveled and have secured to them an inclined board 4, and immediately at the rear of this inclined board is a harrow-tooth bar 5, provided with harrow-teeth 6.

7 denotes a board arranged at the rear edge of the harrow-tooth bar and above the forward edge of the forward drag-bar. The forward edge of this drag-bar is preferably beveled or slanting, so that as it is dragged along it will scoop up loose dirt and lead it up between two cross-boards 8, which form the hopper.

It is evident that as the harrow is dragged along the dirt which is gathered into this hopper will fall out into ruts or depressions in the land, and thereby smooth or level the ground.

A handle 9 is secured to the rear crosspiece of the harrow-frame to afford means for tilting the harrow to allow the harrow-teeth to free themselves of grass, weeds, and rubbish that will cling thereto.

Having thus described the invention, what I claim, and desire to secure by Letters Patent, is—

The combination with the side pieces having stepped recesses, drag-bars, the ends of which are secured in said recesses, an inclined board secured to the forward ends of the side pieces, a harrow-tooth bar secured to the under side of the side pieces immediately at the rear of the inclined board, a board secured at the rear of the harrow-tooth bar, leaving a space between it and the forward edge of the forward drag-bar, and boards extending transversely across the frame to form a hopper into which the dirt may be pushed as the machine is drawn along, and from which it may fall as the machine passes over depressions or ruts in the ground, substantially as set forth.

In testimony whereof I have hereunto set my hand in presence of two subscribing witnesses.

LUCIAN B. REEDS.

Witnesses:
E. C. REEDS,
J. B. PRESTWOOD.